United States Patent [19]

Pinnavaia et al.

[11] Patent Number: 5,672,264
[45] Date of Patent: Sep. 30, 1997

[54] METHODS OF USING STABLE SUPERGALLERY PILLARED CLAY COMPOSITIONS

[75] Inventors: Thomas J. Pinnavaia, East Lansing, Mich.; Jingjie Guan, Beijing, China

[73] Assignee: Board of Trustees operating Michigan State University, East Lansing, Mich.

[21] Appl. No.: 675,275

[22] Filed: Jul. 1, 1996

Related U.S. Application Data

[62] Division of Ser. No. 319,930, Oct. 7, 1994, Pat. No. 5,583,082.

[51] Int. Cl.$^6$ .................................................. C10G 47/02
[52] U.S. Cl. .................... 208/111; 208/110; 208/119; 208/120; 208/134; 208/135; 585/533; 585/721; 585/467; 585/480; 585/670; 585/744
[58] Field of Search .......................... 208/110, 111, 208/119, 120, 134, 135; 585/530, 532, 533, 721, 467, 468, 480, 670, 744

[56] References Cited

U.S. PATENT DOCUMENTS

| | | |
|---|---|---|
| 4,176,090 | 11/1979 | Vaughan et al. |
| 4,248,739 | 2/1981 | Vaughan et al. |
| 4,367,163 | 1/1983 | Pinnavaia et al. |
| 4,637,992 | 1/1987 | Lewis et al. .......................... 502/84 |
| 4,757,040 | 7/1988 | Guan et al. .......................... 502/63 |

OTHER PUBLICATIONS

Shabtaei et al., Proc. 6th Inter. Congr. Catal., BF, 1–7, (1976) (no month).

M.S. Zhou and T.J. Pinnavaia, Catalysis Today 2, 243–259 (1988) (no month).

Yamanaka, S., et al., Mater. Chem. Phys. 17, 87 (1987) (no month).

Occelli, M.L., I & EC Prod. Res and Dev., 22, 553, (1983) (no month).

Guan Jingjie et al., Proc. Intern. Cong. and Exhib. on Pitrol. refining and Pitrol. Processing, Beijing, P.R. China (1991) (no month).

Kenzi Suzuki et al., Clay and Clay Mineral vol. 36, No. 2 P147–152 (1988) (no month).

M. Estermann et al, A Synthetic Gallophosphate Molecular Sieve With a 20–Tetrahedral–atom pore opening Nature, vo. 352, 321–323 (1991) (no month).

*Primary Examiner*—Michael Lewis
*Assistant Examiner*—Thomas G. Dunn, Jr.
*Attorney, Agent, or Firm*—Ian C. McLeod

[57] ABSTRACT

A class of highly stable supergallery pillared clay compositions that have a basal spacing up to 55 Å corresponding a gallery height of 35 Å for samples dried at room temperature and a basal spacing up to 45 Å corresponding a gallery height of 255 Å for samples steamed at 800° C. for 17 hours. Said compositions are prepared by special procedures including pillaring reaction in presence of poly (vinyl alcohol) as a pillaring precursor, an aging process at pH of around 4 to 9, and a calcinating or steaming treatment at high temperature. The new compositions exhibit catalytic properties and adsorption properties superior to prior art pillared clays. Said compositions are useful as catalysts for carbonium-ion reaction, and as adsorbents and catalyst carriers. They are especially suitable for preparing microspheric cracking catalysts for heavy oil or residual feedstock.

6 Claims, 2 Drawing Sheets

METHODS OF USING STABLE SUPERGALLERY PILLARED CLAY COMPOSITIONS

This is a divisional of application Ser. No. 08/319,930 now U.S. Pat. No. 5,583,082, filed on Oct. 7, 1994.

BACKGROUND OF THE INVENTION

1. Field of the Invention

The present invention relates to catalysts for hydrocarbon conversion. More particularly, the invention relates to pillared clay compositions with highly stable supergalleries.

2. Description of Related Art

Pillared clay compositions are prepared by insertion of robust organic cations or inorganic polymeric hydroxy metal cations into the interlayers of clays to open the two adjacent 2:1 clay layers. Thereby unique internal micropore structures with large surface areas, pore volumes, intracrystal acidities, and catalytic activities are created. The larger the interlayer props used as pillars, the more surface areas and pore volumes became available for adsorption and catalytic reaction. Pillared clays should have excellent thermal and hydrothermal stabilities for practical application as catalysts. Under thermal and hydrothermal treatment the props should migrate from the interlayer galleries. The micropore structure with large surface areas, pore volumes, acidities, and catalytic activities needs to be retained. It is apparent that pillared clays with stable supergalleries are among the most useful catalytic materials available for catalyst adsorbents and catalyst carriers.

Up to now pillared clay compositions with highly stable supergalleries have not been reported in the literature. The item "supergallery pillared clays" has been applied to 2:1 layered derivatives in which the gallery height supported by the pillar is substantially larger than thickness of a host layer (~10 Å). The "stable supergallery" means that the supergallery structure does not collapse under thermal and hydrothermal treatment below approximately 800° C. The basal spacings $D_{001}$) of the prior art pillared smectite clays were typically less than that of 30 Å. Interlayer spacings (e.g. gallery heights) were typically no more than that of 20 Å. For example, organic cation pillared smectites had basal spacings of less than 19.0 Å corresponding to gallery heights of less than 9.4 Å (Shabtaei et al., Proc. 6th Inter. Congr. Catal., B5, 1–7, 1976). Inorganic pillared smectites prepared by polymeric cationic hydroxy metal complexes containing aluminum, silicon or zirconium normally exhibited basal spacings of 18.0–22.0 Å and interlayer spacings of 8.4–12.4 Å (U.S. Pat. Nos. 4,176,090, 4,248,739, 4,367,163 and 4,757,040). Although the basal spacings of the pillared clay compositions have been improved in recent years, there was no general synthetic route to highly stable supergallery pillared clays. Chromium pillared smectites had a basal spacing of 27.6 Å and interlayer spacing of 18.0 Å (M. S. Zhou and T. J. Pinnavaia, Catalysis Today 2, 234–259 (1988)). Crystalline titanium pillared montmorillonites had a basal spacing of 29 Å and interlayer spacing of ~19 Å (Yamanaka, S., et al., Mater. Chem. Phys. 17, 87 (1987)). Cerium pillared smectites prepared by developmental $CeO_2$ sol had a basal spacing of approximately 30 Å and an interlayer distance of ~20 Å (U.S. Pat. No. 4,637,992). A serious limitation of all the pillared clay compositions mentioned above were not stable under thermal and, especially, hydrothermal treatment. The species that serve to prop open the adjacent 2:1 clay layer of smectites were expelled from the interlayer galleries and then caused the interlayer spacing to collapse during thermal or hydrothermal treatment. It is apparent that the disintegration of the pillar structure causes the micropore structure, adsorption performances, and catalytic activities to diminish drastically. As reported in the literature aluminum pillared smectites treated at 730° C. for 4 hours with steam resulted in a loss of 90% of their surface areas and 80% of their pore volumes. Their catalytic activity for cracking gas oil drops sharply from 80% to 30% (Occelli, M. L., I & EC Prod. Res and Dev., 22, 553, (1983)).

So far the best previously reported pillared clay compositions with respect to stable galleries were aluminum pillared rectorites. These materials were prepared by reacting rectorite clays with polymeric aluminum chlorohydroxide solution. After steaming treatment at 800° C. for 17 hours the aluminum pillared rictorites retained most of their gallery structure, adsorption performances, and catalytic activities. However, the products had a basal spacing of about 29.0 Å corresponding a interlayer spacings of about 9.4 Å due to a rectorite layer thickness of 19.6 Å. Owing to the limited basal spacing of the prior pillared rictorites their surface areas, pore volumes, acidities, and catalytic activities were not good enough to meet requirements of the petroleum processing industry. For example a microspheric cracking catalyst containing the prior pillared rectorits compositions had a surface area of only 126 $m^2/g$, a pore volume of 0.13 ml/g, and a microactivity (MAT) of 58%. After steaming treatment at 800° C. for 17 hours it has the MAT of 42% versus a commercial REY catalyst of 61%. In cracking heavy oil fraction (330°–520° C.) with a riser pilot plant the pillared rectorits gave a conversion of 63 versus commercial REY catalyst of 67 indicating that the activity of the prior pillared rectorits cracking catalyst is slightly lower than that of the REY zeolite cracking catalyst (Guan Jingjie et al., Proc. Intern. Cong. and exhib. on Pitrol. refining and Pitrol. Processing, Beijing, P. R. China, (1991)).

In the prior methods used for preparation of pillared clays, none were effective for obtaining derivatives with highly stable supergalleries. In general, unmodified polymerized aluminum chlorohydroxide solutions were used as pillaring reagents for the preparation of pillared clays. As reported in the literature, this pillaring agent has a characteristic $^{27}Al$ NMR peak near 63.0 ppm, indicating a Keggin ion-like $[Al_{13}O_4(OH)_{24}(H_2O)_{12}]^{+7}$, structure (abbreviated $Al_{13}$). The $Al_{13}$ species forms only single pillar structure. The typical structure model for pillared smectites prepared from $Al_{13}$ is based on a single layer and single $Al_{13}$ pillar aggregate (U.S. Pat. No. 4,176,090). The typical structure model for pillared rictorites prepared by reacting rectorites and $Al_{13}$ is a double host layer and single pillar structure (U.S. Pat. No. 4,757,040). So the gallery heights of the pillared clays prepared from the $Al_{13}$ oligomer are limited to 10 Å. Although a method to enlarge the pore size by means of adding poly (vinyl alcohol) to clays was reported in the literature, it was not successful in obtaining stable supergallery networks. The pillared clays from this method lost their long range order when calcinated in the air. So pillared clay compositions with stable supergallery structure were not obtained (Kenzi Suzuki et al., Clay and Clay Mineral Vol. 36, No. 2 P147–152 (1988)).

All the data above clearly indicate that prior pillared clays lacked the desired stable supergallery structures needed to obtain highly catalytic activity for large molecular reactants. So far pillared clays with stable supergalleries and their preparation method have not been obtained in the prior art.

OBJECTS

An object of the present invention is to provide a class of pillared clay compositions with stable supergalleries.

Another object of the present invention is to provide a general method for the preparation of these compositions.

Still another object of the present invention is to provide an application for these compositions as catalyst adsorbents, and catalyst supports.

It is further an object of the present invention to provide pillared clay compositions with stable supergalleries which are relatively easy to prepare and which are economic.

These and other objects will become increasingly apparent by reference to the following description and the drawings.

BRIEF DESCRIPTION OF DRAWINGS

FIG. 2A is for a sample dried at room temperature. FIG. 2B is for a sample steamed at 800° C. for 17 hours.

DESCRIPTION OF PREFERRED EMBODIMENTS

The present invention relates to a supergallery clay composition selected from the group consisting of pillared rectorite clay and rectorite-like interstratified clay pillared clay composition with interlayer spacing of pillared galleries greater than about 9.5 Å and containing a pillaring agent selected from the group consisting of polymeric metal oxide precursors and a metal oxide derived therefrom in an amount sufficient to produce the interlayer spacing.

The present invention also relates to a method for preparing pillared clay composition with a stable supergallery consisting of a precursor, a pillaring agent and a rectorite or rectorite-like clay which comprises:

(a) preparing a Na-exchanged clays by ion exchange method;

(b) preparing 0.1–10% wt aqueous solution of an organic polymer precursor;

(c) preparing an Al or Zr or Si pillaring agent aqueous solution with a concentration of 10 to 1000 milligram-atom per liter;

(d) mixing the Na-exchanged clays with the pillaring agent solution at a ratio of 1.0 to 10 milligram-atom Al or Zr or Si to per gram of clay in the presence of an aqueous solution containing 0.01–1.00 gram of the precursor at 20°–85° C. to form a resulting mixture;

(e) aging the resulting mixture at temperature 20°–85° C., for period of about 1 to 3 hours and holding the pH of 4 to 9 with the dropwise addition of a base to form hydrated composition;

(f) filtering and washing the hydrated composition; and (g) calcinating the hydrated composition at 500° to 800° C. for 2 to 17 hours, preferably in an inert gas or in steam and then cooling in the air to form the composition.

Finally, the present invention relates to a method for catalyzing a reaction, the improvement which comprises:

providing a supergallery clay selected from the group consisting of a rectorite clay and rectoritelike interstratified clay composition with interlayer spacing of pillared galleries greater than about 9.5 Å and containing a pillaring agent selected from the group consisting of a polymeric oxide precursor and a metal oxide derived therefrom in an amount sufficient to produce the interlayer spacing.

The present invention particularly provides a class of highly stable supergallery pillared rectorite clays (abbreviated SG-PIC). The SG-PIC dried at room temperature have a basal spacing of up to 55Å and an interlayer spacing of up to 35 Å. After treating at 800° C. for 17 hours with 100% steam they exhibit a basal spacing of up to 45 Å and an interlayer spacing up to 25 Å. The SG-PIC have surface areas, pore volumes, acidities, and catalytic activities superior to prior art pillared clays.

The present invention also provides methods for preparation of SG-PIC compositions. Specifically, the said compositions of the present invention are prepared by reacting of clays having swelling properties like rectorites or smectites and polymeric cationic hydroxy complex including Al, Si, Zr in the presence of pillaring precursor, such as poly (vinyl alcohol) (abbreviated PVA), following by aging process at 20°–80° C. for 1 to 3 hours in pH of 4 to 9 and calcination treatment at 500°–800° C. for 2 to 17 hours, preferably in an inert (from reactive) gas or steam atmosphere.

Furthermore, the present invention provides applications for the said SG-PIC compositions. The SG-PIC of the present invention are useful as catalysts for carbonium-ion type reactions such as catalytic cracking, hydrocracking, reforming, oligomerization and alkylation. They are especially suitable for preparing microspheric cracking catalysts for heavy oil or residual feedstock. They are also useful as adsorbents and catalyst carriers.

Figure 1:
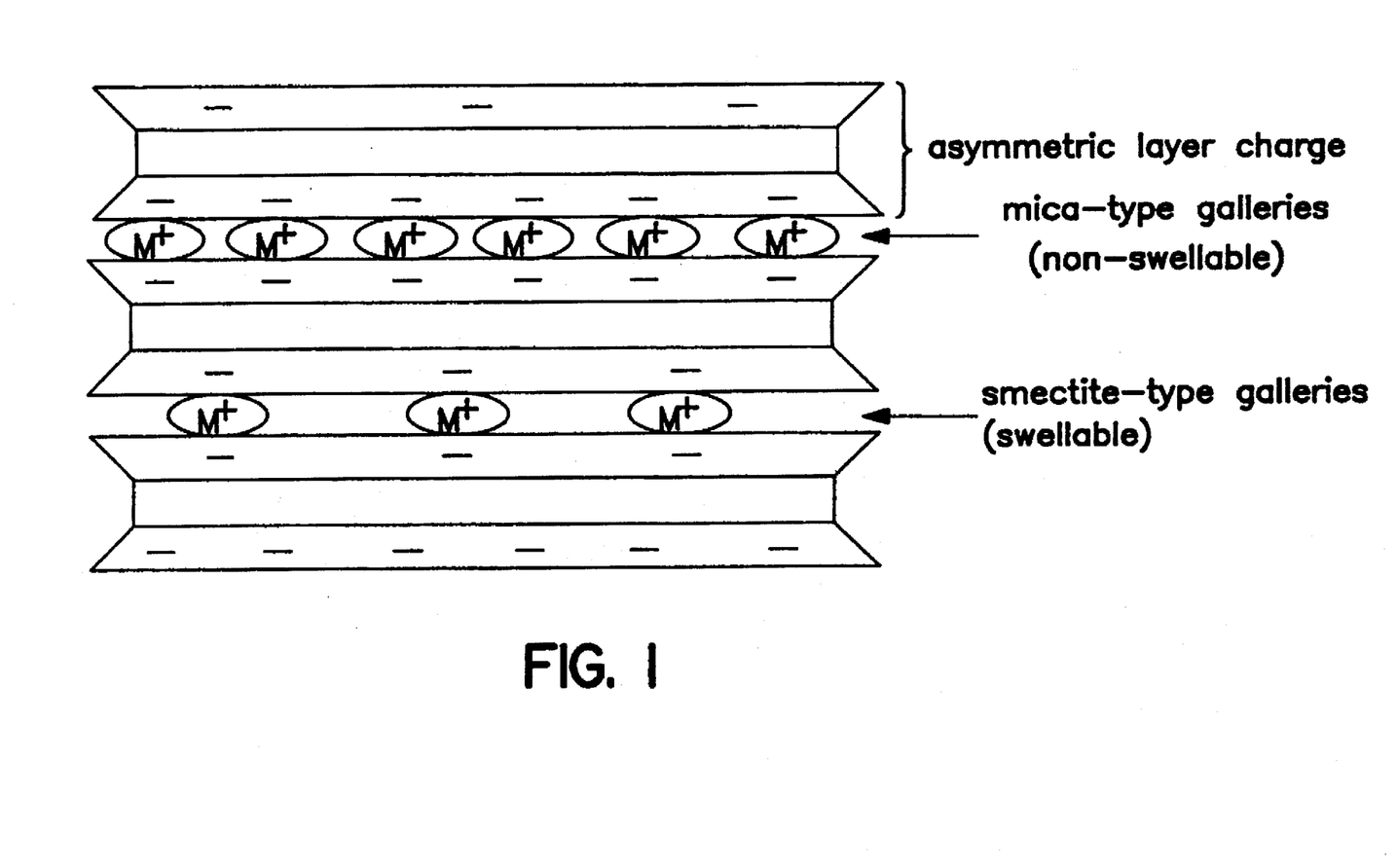
FIG. 1 is an enlarged schematic view of a mixed layer clay rectorite. The swelling and non-swelling interlayers in the regularly interstratified mineral rectorite are shown.

The composition of the present invention represent a class of clay molecular sieve products. Said clays are rectorites or related interstratified structures. "Rectorite" consists of swellable, smectite-like, interlayers and non-swellable, mica-type, interlayers, alternately arranged in a regular stacking sequence. FIG. 1 illustrates the arrangement of interlayers (or "gallery") in rectorits. Related rectorits-like gallery sequences occur in other interstratified clay mineral families such as mica/smectites, illite/smectites, glauconite/smectites chorite/smectites, vermiculite/smectites, and kaolin/smectites. The layer stacking sequences in these latter interstratified mineral may be irregular or short-ranged.

The outstanding feature of the present invention is that a pillared clay based composition is provided in which a highly stable supergallery network is obtained by the reaction of a swelling clays, preferably rectorite or a rectorite-like interstratified clay, and pillared agent in the presence of a pillar precursor, aging at 20°–85° C. for 1 to 3 hours at pH of 4 to 9, and subsequently calcinating at 500° to 800° C. for 2 to 17 hours, preferably in inert gas or steam atmosphere.

Figure 2A:
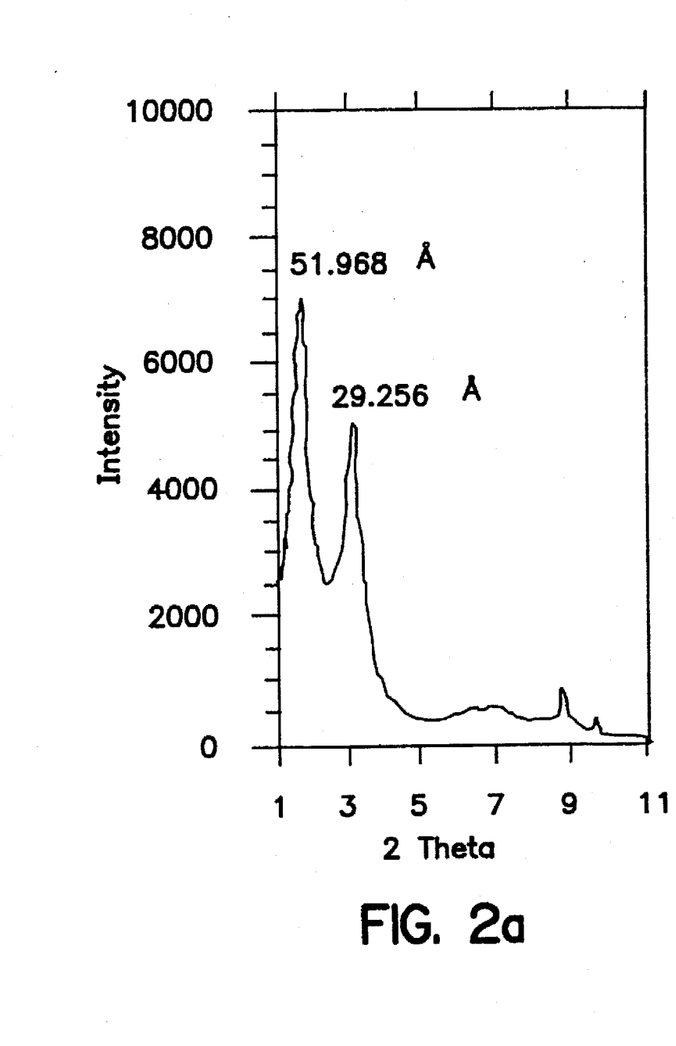
FIGS. 2A and 2B are graphs showing an X-Ray powder diffraction (XRP) pattern (001) of stable supergallery pillared rectorites of the present invention.
Figure 2B:
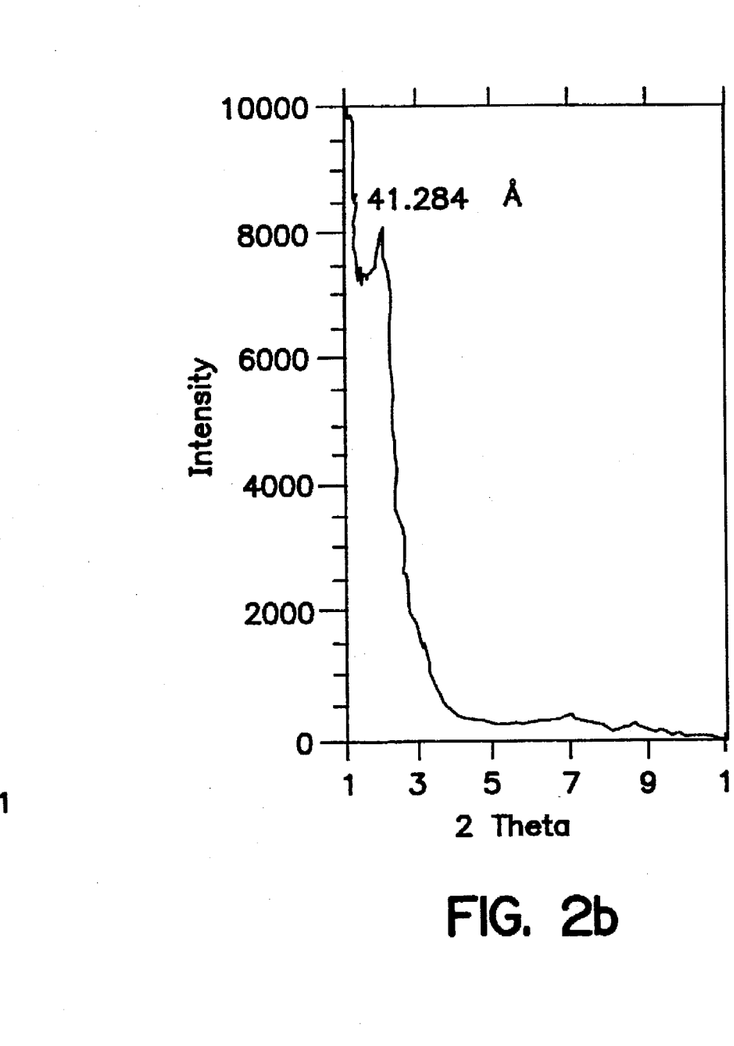

The SG-PIC compositions of the present invention have a basal spacing up to 55 Å and an interlayer spacing up to 35 Å. After treatment at 800° C., for 17 hours with 100% steam. The said compositions retain a basal spacing of 45 Å corresponding to 25 Å. The XRD pattern of the typical SG-PIC compositions of present invention are shown in FIG. 2 indicating that the pillared clays of the present invention contain a highly stable supergallery structure.

The SG-PIC compositions of the present invention have surface areas of 180–220 m²/g and pore volumes of 0.16–0.30 ml/g. After treatment at 800° C. for 17 hours with 100% steam the said compositions retain surface areas of 150–200 m²/g and pore volumes of 0.13–0.30 ml/g indicating that the SG-PIC of present invention have excellent thermal and hydrothermal stabilities.

The SG-PIC compositions of the present invention exhibit Bronsted and Lewis acidities superior to prior pillared clays.

The SG-PIC compositions of the present invention have high catalytic activities. After steaming treatment at 800° C. for 17 hours the said SG-PIC compositions gave a gas oil cracking microactivity test (MAT) greater than 64% versus of 53% for the prior pillared clays.

The SG-PIC compositions of the present invention are prepared using clays that have swelling properties, a pillaring agent and a precursor as starting raw materials. The preparation procedures of the said compositions comprise steps as follows:

(a) Preparing Na-exchanged clays by conventional ion exchange method.

(b) preparing 0.1–10% wt precursor aqueous solution.

(c) preparing the pillaring agent aqueous solution with concentration of 10–1000, preferably 30–100 milligram-ion $Al^{(III)}$ or $Zr^{(IV)}$ or $Si^{(IV)}$ per liter.

(d) pillaring the Na-exchanged clays with the pillaring agent solution at a ratio of 1.0–10 milligram-atom Al or Zr or Si to per gram clay in the presence of an aqueous solution containing 0.01–1.00 gram (try basis) precursor at 20°–85° C.

(e) aging the resulting mixtures at temperature 20°–85° C., for period of about 1 to 3 hours and holding the pH of 4 to 9 with the dropwise addition of 3% $NH_4OH$ as needed.

(f) filtering and washing by conventional methods.

(g) calcinating at 500°–800° C. for 2 to 17 hours, preferably in an inert gas or in steam then cooling off in the air.

Herein the said precursor is polyvinyl alcohol (PVA) or an organic polymers containing p-$CH_2CHOH$-$]_n$. linkages. The said precursor is preferably a PVA having an average molecular weight of 50,000 and more than $99^+$% hydrolyzed vinyl groups. The said pillaring agent is a polymeric cationic hydroxy complex of Al, Zr or Si that is selected from a group consisting of aluminum-sol including polymerized aluminum chlorohydroxide, zirconium-sol including polymerized zirconium chlorohydroxide, silica-sol and copolymers or mixtures thereof. The said pillaring agent is preferably commercially available aluminum chlorohydroxide solution ($Al_2(OH)_5Cl$) that has been diluted to less than 80 milligram-atom aluminum per liter and adjusted by the addition of 3% wt $NH_4OH$ to a pH of 5.5. The said clays are selected from a naturally occurring or chemically synthesized group of interstratified clays consisting of rectorites, or rectorite-like gallery sequences. The said clays are preferably Na-exchanged rectorites or mixtures thereof. Herein the said pillaring process is that the precursor is first mixed with either the clays or with the pillaring agent and then mixed with the other raw materials. The said aging is preferably carried out at 70° to 75° C., for 2 to 3 hours while holding pH of 5.5–7.5. The said calcinating is preferably done at 650°–800° C., for 2 hours, preferably in an inert gas and steaming process is preferably carried out at 800° C. for 17 hours with 100% steam and then cooling off in the air.

The outstanding features of present methods are as follows:

(a) A precursor, such as PVA, is used for the preparation of the pillared clays. In first place the PVA sews to swell and separate the clay layers and to facilitate the pillaring reaction. Also, the PVA modifies the hydrolysis properties of $Al_{13}$ resulting in formation of $(Al_x)Y$ pillaring species. The $(Al_x)Y$ species obtained in the presence of the PVA can form condensed pillars of greater nuclearity so that supergallery structures are created.

(b) A special aging process and extended pH range for the pillaring reaction are used for preparation of the new supergallery pillared clays. In prior art the pillaring reaction was within the pH limits of 4 to 6. Outside these limits the Al-pillaring agent was destroyed. However, in the present invention due to modification of the $Al_{13}$ solution by PVA, allows the aging process for pillaring reaction to be extended to the pH range of 4 to 9. At a pH of around 7.0 for the aging process, the pillared clays with highly stable supergalleries are successfully synthesized.

(c) A new calcination art involving the use of an inert or steam at high temperature for preparation of the stable supergallery pillared clays is disclosed. Calcinating or steaming the interlayed products removes the PVA precursor resulting in the formation of a supergallery pillared structure. Especially, heating in the absence of oxygen gas avoids the rapid burn-off of PVA that occurs in the air. Also carbon from the PVA deposits in the network of aluminum pillars and forms interstitial compounds which have excellent thermal and hydrothermal stabilities. This results in the highly stable supergallery pillared clays.

The structural characteristic of the pillared rectorites of the present invention are as follows: samples dried at room temperature possess a layer thickness of 19 to 20 Å, a basal spacing ($D_{001}$) up to 55 Å and interlayer distance up to 35 Å.

The SG-PIC of the present invention have the characteristic of an open porous structure, solid acid sites, and excellent thermal hydrothermal stabilities and high catalytic activities suitable for catalysts, especially carbonium-ion catalyzed reactions, adsorbents and carriers. More particularly the SG-PIC of the present invention possess not only the characteristics mentioned in the prior art but also have highly stable supergallery structures. After treatment at 800° C., for 17 hours with 100% steam the pillared rectorites of the present invention retain thickness of 19 to 20 Å, a basal spacing of 45 Å and interlayer distance of 25 Å. These properties are advantageous to catalytic reactions of large molecular reactants.

The SG-PIC compositions of the present invention may be combined with other zeolites or clays, or with inorganic oxides or inorganic hydrogel or hydrosol, including aluminum silicon an zirconium, to prepare catalysts adsorbents and carries. Said products are also useful in the preparation of catalysts which contain active/stabilizing metals such as platinum, palladium, cobalt, molybdenum, nickel, tungsten rare-earths and so forth as will as zeolite or matrix components such as faujasite, kaolinites, and inorganic oxides. These catalysts are used in conventional petroleum conversion processes such as catalytic cracking, hydrocracking, reforming, oligomerization, alkylation, and isomerization and as molecular sieve adsorbents, and carries.

The following specific examples will give further illustration of the present invention, but they do not limit the scope of the present invention.

COMPARATIVE EXAMPLE 1

This example illustrates the preparation and properties of pillared rectorites using prior art described in U.S. Pat. No. 4,757,040.

The prior pillared rectorites were obtained by preparing polymerized aluminum chlorohydroxide solution with concentration of 33 milligram-atom aluminum per liter, adjusting pH of this solution up to 5.5 with 3% $N_4OH$ in aqueous solution, adding 10 g Na-exchange rectorite slurry having solid content of 2.5% wt to the polymerized aluminum chlorohydroxide solution, holding the pH of 5.5 with 3% NH$_4$OH for 1 hour, filtering and washing with deionized water to Cl$^{-1}$ free, drying at 120° C., and calcinating at 650° C., for 2 hours or steaming at 800° C., for 17 hours. Thereby the drying samples calcinating samples and steaming samples were obtained by prior art.

The basal spacings of said samples were measured by conventional X-ray powder diffraction method. The BET surface areas and pore volumes were measured from low temperature nitrogen adsorption and adsorption isotherms under continuous full sorption conditions using an OMNISORP360X adsorption instrument. Bronsted (B) and Lewis (L) acidity types were measured by infrared spectroscopy method using pyridine as an adsorbate. Catalytic activity for cracking gas oil was obtained by the MAT method with operation conditions of 460° C., reaction temperature, a weight hourly space velocity (WHSV) of 16 hours-1, and a catalyst to oil ratio (c/o) of 4. The structure Characteristic and porosity properties of the prior pillared rectorires are listed in Tables 1 and 2.

TABLE 1

| Samples | Basal Spacing Å | Interlayer spacing Å |
| --- | --- | --- |
| Samples dried at 20–25° C. | 29.1 | 8.5 |
| Samples steamed at 800° C. for 17 hrs. | 27.4 | 7.8 |

TABLE 2

| | Adsorption Performances | | Catalytic Properties | |
| --- | --- | --- | --- | --- |
| | Surface Areas | Pore Volume | | |
| Samples | m2/g | ml/g | Acidity | MAT % |
| Samples Calcined at 650° C. for 2 hrs. | 163 | 0.161 | L. B. | 59 |
| Samples steamed at 800° C. for 17 hrs. | 148 | 0.138 | L. B. | 53 |

L = Lewis Acidity; B = Bronsted Activity

EXAMPLE 2

This example indicates that pillared clays with stable supergallery having a basal spacing of 52 Å can be prepared by a procedure of the present invention.

Na-exchange rectorites were prepared by stirring a mixture of 10 g naturally occurring Ca-rectorites with 4 g NaCl and 140 g deionized, filtering and washing with 140 ml of 0.5 M NaCl aqueous solution. The solid content of the rectorite filter cake was around 60% wt.

A 1.68 quantity of commercially available PVA having average molecular weight of about 50,000 and 99$^+$% hydrolyzed was dissolved in 168 ml deionized water.

A 10.5 ml a liquid of commercially available aluminum chlorohydroxide solution (Al$_2$(OH)$_5$Cl) containing 23.7% wt Al$_2$O$_3$ was diluted to 800 ml with deionized water and pH of the solution was adjusted to 5.5 with 3% wt NH$_4$OH an aqueous solution.

The Na-rectorite cakes were added to a PVA an aqueous solution and stirred for 0.5 hours to obtain a PVA-rectorite slurry.

The highly stable supergallery pillared clays of the present invention were prepared by adding the PVA-rectorite slurry to the aluminum chlorohydroxide solution, aging the resulting mixture slurry at 70°–75° C. for 2–3 hours and holding pH at 7.0–7.5 by the addition of 3% NH$_4$OH, then filtering and washing with 1 liter of deionized water, air drying and calcinating at 650° C., for 2 hours in an inert gas or steaming at 800° C. for 17 hours and cooling off in the air. Thus the drying samples, calcinating samples, and steaming samples respectively were obtained.

The basal spacings, surface areas, pore volumes, acidities and microactivities (MAT) of the said samples were measured according to methods described in Comparative Example 1.

The structure characteristic and performances of pillared rectorites with highly stable supergallery prepared by the present invention are listed in Tables 3 and 4.

TABLE 3

| Samples | Basal Spacing Å | Interlayer spacing Å |
| --- | --- | --- |
| Samples dried at 20–25° C. | 52.0 | 32.4 |
| Samples teamed at 800° C. for 17 hrs. | 41.3 | 21.7 |

TABLE 4

| | Adsorption Performances | | Catalytic Properties | |
| --- | --- | --- | --- | --- |
| | Surface Areas | Pore Volume | | |
| Samples | m2/g | ml/g | Acidity | MAT % |
| Samples Calcined at 650° C. for 2 hours | 218 | 0.25 | L. B. | 69 |
| Samples steamed at 800° C. for 17 hours | 200 | 0.20 | L. B. | 64 |

EXAMPLE 3

This Example illustrates the preparation procedures and performances of the pillared clays with various supergalleries heights of the present invention.

A 10.5 ml quantity of aluminum chlorohydroxide containing 23.7% wt Al$_2$O$_3$ described in Example 2 was diluted to 800 ml and the pH of the solution was adjusted to 5.5 with 3% wt N$_4$OH. The PVA-rectorite slurry containing 10 g (dry basis) of Na-rectorite and 1.68 g PVA described in Example 2 was added to the aluminum chlorohydroxide solution. The mixture was aged at 70°–75° C., for 2 to 3 hours while holding the pH at 5.8 with 3% N$_4$OH. The resulting slurry was filtered, shower washed with 1 liter deionized water below 60° C., and then dried in the air at room temperature to obtain sample No. 5.8. The same procedure was used to prepare sample No. 6.2, No. 7.0 and No. 8.5 except that the reaction mixture was allowed to age at pH values of 6.221, 7.051, and 8.572 respectively. The samples were calcinated at 650 for 2 hours in an inert gas or deactivated at 800° C., for 17 hours in 100% steam according to methods described in Example 2. Their structure, adsorption performance and catalytic property were measured. The data are given in Tables 5 and 6.

TABLE 5

| Samples | Basal Spacing Å | Interlayer spacing Å |
|---|---|---|
| Sample No. 5.8 | | |
| Dried at 20–25° C. | 39.1 | 19.5 |
| Steamed at 800° C. for 17 hrs. | 32.0 | 12.4 |
| Sample No. 6.2 | | |
| Dried at 20–25° C. | 44.6 | 25.0 |
| Steamed at 800° C. for 17 hrs. | 35.9 | 16.3 |
| Sample No. 7.0 | | |
| Dried at 20–25° C. | 52.0 | 32.4 |
| Steamed at 800° C. for 17 hrs. | 42.9 | 23.3 |
| Sample No. 8.5 | | |
| Dried at 20–25° C. | 40.5 | 20.9 |
| Steamed at 800° C. for 17 hrs. | 41.3 | 21.28 |

TABLE 6

| | Adsorption Performances | | Catalytic |
|---|---|---|---|
| Samples | Surface Areas m²g | Pore Volume ml/g | Property MAT % |
| Sample No. 5.8 | | | |
| Calcinated at 650° C. for 2 hrs. | 183 | 0.18 | |
| Steamed at 800° C. for 17 hrs. | 158 | 0.25 | 65 |
| Sample No. 6.2 | | | |
| Calcinated at 650° C. for 2 hrs. | 189 | 0.22 | |
| Steamed at 800° C. for 17 hrs. | 162 | 0.39 | 63 |
| Sample No. 7.0 | | | |
| Calcinated at 650° C. for 2 hrs. | 218 | 0.24 | |
| Steamed at 800° C. for 17 hrs. | 200 | 0.20 | 64 |
| Sample No. 8.5 | | | |
| Calcinated at 650° C. for 2 hrs. | 197 | 0.16 | |
| Steamed at 800° C. for 17 hrs. | 168 | 0.29 | 50 |

EXAMPLE 4

This example shows that the present invention pillared clays with stable supergallery were also prepared by means of adding the precursor to the pillaring agent.

A 10.5 ml quantity of aluminum chlorohydroxide containing 23.7% wt $Al_2O_3$, described in Example 2, was diluted to 800 ml and the pH of the solution was adjusted to 5.5 with 3% $NH_4OH$. Then 168 ml of an aqueous solution containing 1.68 g PVA was added to the aluminum solution followed by adding 10 g of Na-rectorites. The resulting slurry was aged at 70°–75° C., for 2 to 3 hours while holding the pH at 5.5 with the dropwise addition of 3% by wt of a $NH_4OH$ solution. The slurry was filtered, shower washed with 1 liter deionized water below 60° C., then dried in room temperature and calcinated at 650 for 2 hours in the ago gas, or steam deactivated at 800° C., for 17 hours and cooled off in the air.

The adsorption and catalytic properties were tested using methods described in Example 2. The results are listed in Tables 7 and 8.

TABLE 7

| Samples | Basal Spacing Å | Interlayer Spacing Å |
|---|---|---|
| Samples dried at 20–25° C. | 37.2 | 17.6 |
| Samples steamed at 800° C. for 17 hrs | 32.5 | 12.9 |

TABLE 8

| | Adsorption Performances | | Catalytic Properties | |
|---|---|---|---|---|
| Samples | Surface Areas m²/g | Pore Volume ml/g | Acidity | MAT % |
| Samples Calcinated at 650° C. for 2 hrs. | 256 | 0.25 | L. B. | 68 |
| Samples teamed at 800° C. for 17 hrs. | 179 | 0.16 | L. B. | 63 |

EXAMPLE 5

This Example shows that pillared clays with supergalleries of present invention can be prepared from refluxed $ZrOCl_2 \cdot 4H_2O$ solution in the presence of the precursor.

A 0.33M $ZrOCl_2 \cdot 4H_2O$ solution was refluxed at 90°–95° C., for 34 hours and then 63 ml of this solution was diluted to 125 ml. A PVA-rectorite slurry containing 5 g rectorites (dry basis) and 0.842 g PVA, described in Example 2, were added to the Zr-solution. The mixture was aged at room temperature for 2 hours, filtered, shower washed with 1 liter deionized water below 60° C., and dried at room temperature. Thereby samples A with supergallery were obtained. In order to compare with prior art, zirconia pillared rectorites B were prepared according to a method reported in U.S. Pat. No. 4,176,090.

The samples A have a basal spacing of 42.2 Å and an interlayer spacing of 23.6 Å but the samples B have only a basal spacing of 29.1 Å and interlayer spacing of 9.5 Å.

We claim:

1. In a method for catalyzing a reaction selected from the group consisting of catalytic cracking, hydrocracking, reforming, oligomerization, alkylation, and isomerization, the improvement comprising:

contacting a feed stream with a pillared supergallery clay composition selected from the group consisting of a rectorite clay and those clays having an interstratified stacking sequence of layers selected from the group consisting of mica/smectites, illite/smectites, glauconite/smectites, chlorite/smectites, vermiculite/smectites, and kaolin/smectites containing a polymeric precursor of a metal oxide as a pillaring agent, wherein the composition has a basal spacing of 37.2 to 52 Å and an interlayer spacing of 17.6 to 32.4 Å at conditions effective to catalyze said reaction.

2. The improvement of claim 1 wherein said metal oxide is selected from the group consisting of oxides of alumina, zirconia, silica, copolymers thereof, and mixtures thereof.

3. The improvement of claim 1 wherein said clay composition is selected from the group consisting of naturally occurring, chemically synthesized interstratified rectorite clay compositions, and mixtures thereof.

4. In a method for catalyzing a reaction selected from the group consisting of catalytic cracking, hydrocracking, reforming, oligomerization, alkylation, and isomerization, the improvement comprising:

contacting a feed stream with a calcined pillared supergallery clay composition selected from the group consisting of a rectorite clay and those clays having an interstratified stacking sequence of layers selected from the group consisting of mica/smectites, illite/smectites, glauconite/smectites, chlorite/smectites, vermiculite/smectites, and kaolin/smectites containing a calcined metal oxide as a pillaring agent, wherein the composition has a basal spacing of 32 to 521 and an interlayer spacing of 12.9 to 32.4 Å at conditions effective to catalyze said reaction.

5. The improvement of claim 4 wherein said metal oxide is selected from the group consisting of oxides of alumina, zirconia, silica, copolymers thereof, and mixtures thereof.

6. The improvement of claim 4 wherein said clay composition is selected from the group consisting of naturally occurring, chemically synthesized interstratified rectorite clay compositions, and mixtures thereof.

* * * * *

UNITED STATES PATENT AND TRADEMARK OFFICE
CERTIFICATE OF CORRECTION

PATENT NO. : 5,672,264
DATED : September 30, 1997
INVENTOR(S) : Thomas J. Pinnavaia and Jingjie Guan    Page 1 of 2

It is certified that error appears in the above—identified patent and that said Letters Patent is hereby corrected as shown below:

Column 1, line 40, "spacings $D_{001}$)" should be --spacings $D_{001}$--.

Column 2, line 15, "rictorites" should be --rectorites--.

Column 2, line 18, "corresponding a interlayer spacings" should be --corresponding to interlayer spacings--.

Column 2, line 20, "rictorites" should be --rectorites--.

Column 2, line 24, "rectorits" should be --rectorite--.

Column 2, line 29, "rectorits" should be --rectorite--.

Column 2, line 30, "rectorits" should be --rectorite--.

Column 2, line 47, rictorites" should be --rectorites--.

Column 4, line 37, "rectorits", both occurrences, should be --rectorite--.

Column 6, line 45, "an zirconium" should be --and zirconium--.

Column 6, line 49, "as will as" should be --as well as--.

Column 7, line 21, "rectorires" should be --rectorites--.

Column 7, line 63, "10.5 ml a liquid" should be --10.5 ml

UNITED STATES PATENT AND TRADEMARK OFFICE
CERTIFICATE OF CORRECTION

PATENT NO. : 5,672,264
DATED : September 30, 1997
INVENTOR(S) : Thomas J. Pinnavaia and Jingjie Guan    Page 2 of 2

It is certified that error appears in the above—identified patent and that said Letters Patent is hereby corrected as shown below:

liquid--.

Column 8, line 28 (Table 3, column 1), "Samples teamed" should be --Samples steamed--.

Column 8, line 56, "N$_4$OH" should be --NH$_4$OH--.

Column 8, line 60, "N$_4$OH" should be --NH$_4$OH--.

Columns 7 and 8 (Tables 2 and 4), the Headings "m2/g" should be --m$^2$/g--.

Column 9, line 35, (Table 6, 2nd column), the heading "Surface areas m$^2$g" should be --Surface areas m$^2$/g--.

Column 10, line 36 (Table 8), "Samples teamed" should be --Samples steamed--.

Column 12, line 9 (Claim 4), "spacing of 32 to 521" should be --spacing of 32 to 52 Å--.

Signed and Sealed this

Seventeenth Day of March, 1998

Attest:

BRUCE LEHMAN

Attesting Officer    Commissioner of Patents and Trademarks